J. N. MAHONEY.
CIRCUIT INTERRUPTER.
APPLICATION FILED AUG. 11, 1913.

1,274,733.

Patented Aug. 6, 1918.
2 SHEETS—SHEET 2.

WITNESSES:
Fred H. Miller
J H Procter

INVENTOR
Joseph N. Mahoney
BY
ATTORNEY

F. W. MEYER.
CONVERTING SYSTEM.
APPLICATION FILED MAR. 24, 1915.

1,274,741.

Patented Aug. 6, 1918.
2 SHEETS—SHEET 2.

WITNESSES:

INVENTOR
Friedrich W. Meyer.
BY
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONVERTING SYSTEM.

1,274,741.  Specification of Letters Patent.  Patented Aug. 6, 1918.

Application filed March 24, 1915. Serial No. 16,678.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Converting Systems, of which the following is a specification.

My invention relates to alternating-current converting systems, and it has for its object to provide circuits and apparatus whereby energy may be transferred from a single-phase system to a polyphase system without the interposition of heavy moving parts.

Figure 2:
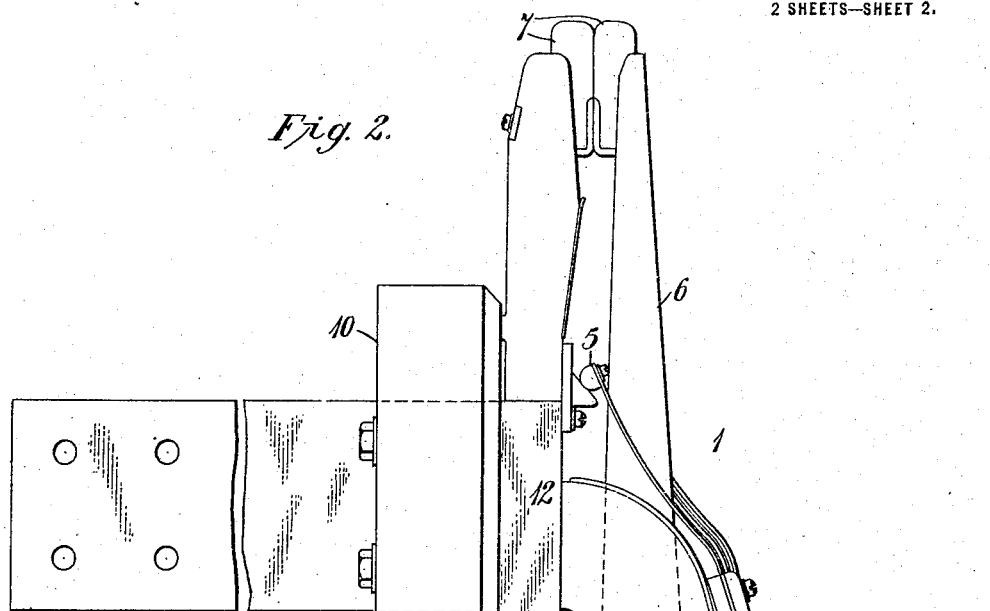
Figure 3:
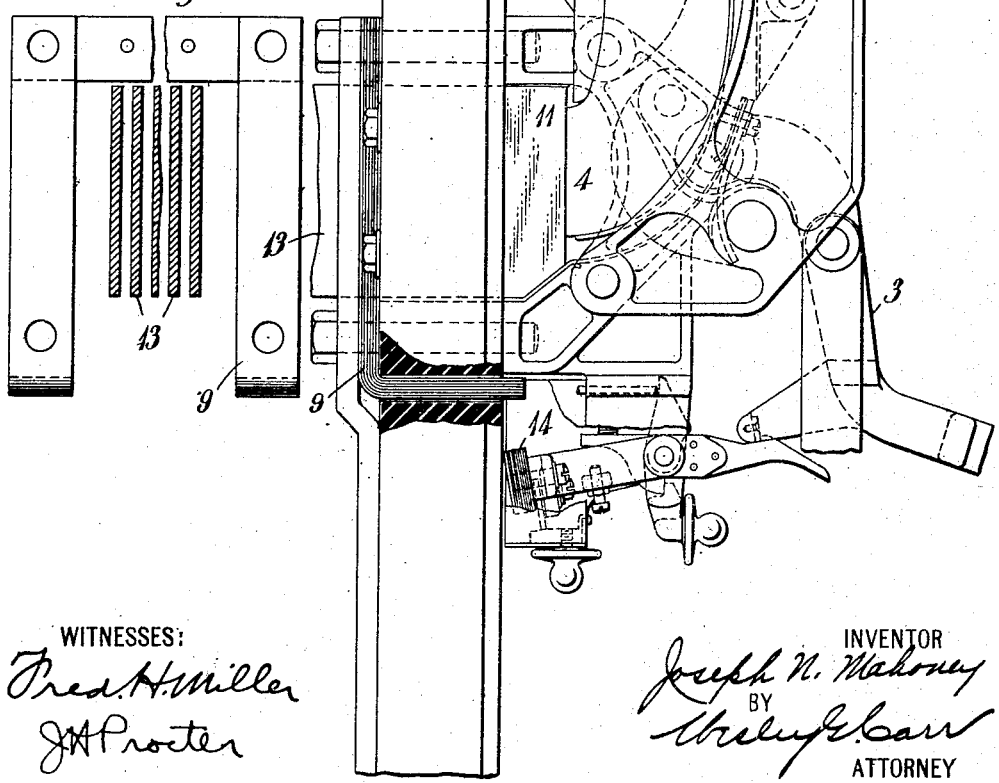
Figure 2:
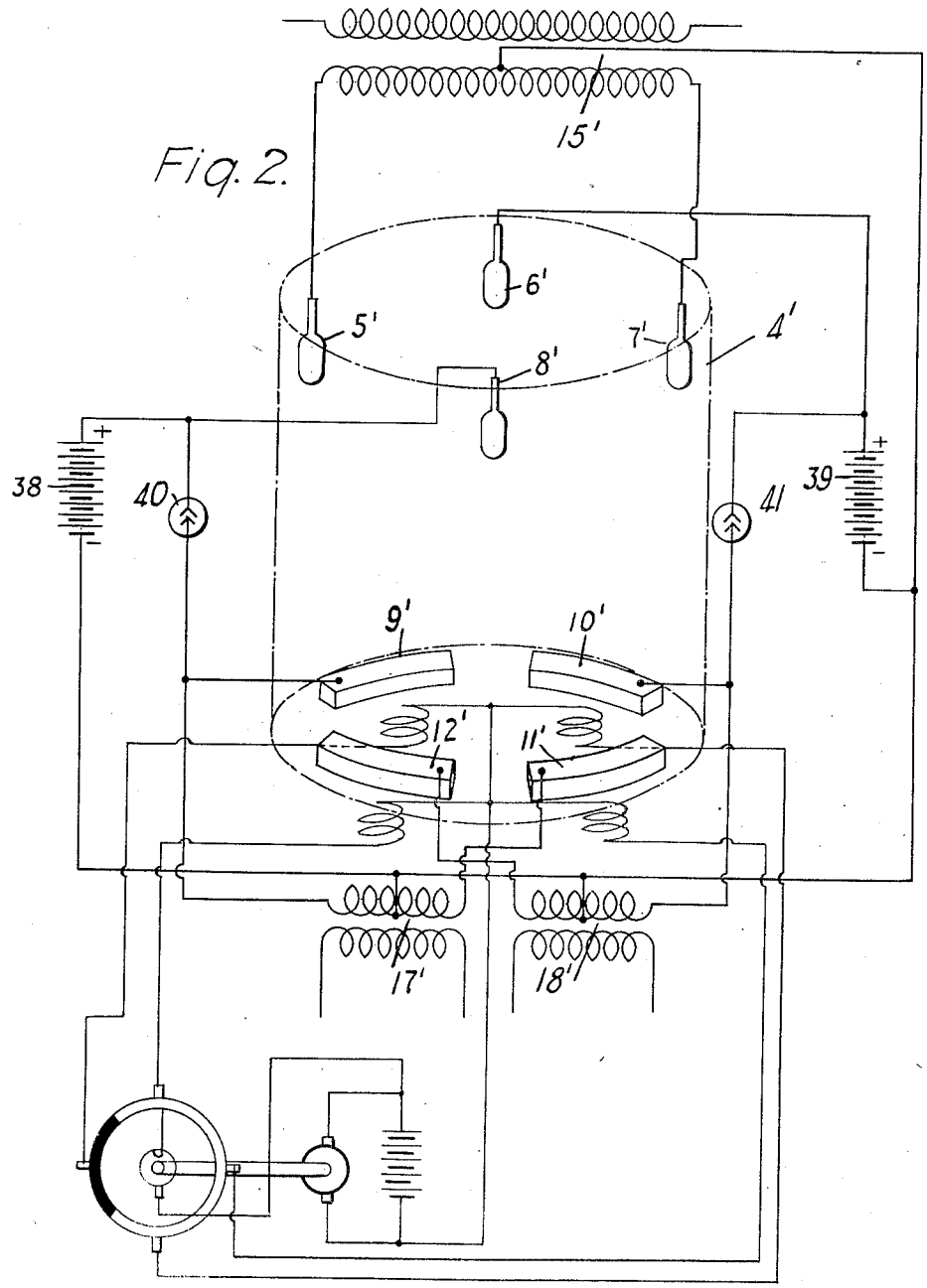

In the accompanying drawings, Figure 1 is a side view, partially in section, of a vapor device embodying one form of my invention; Fig. 2 is a skeleton view of a modification of the device shown in Fig. 1; and Fig. 3 is a wave diagram illustrating the operation of my device.

In the operation of systems of electrical distribution, it is frequently necessary to transfer energy from a single-phase system to a polyphase system, as, for example, in electric locomotives operating from a single-phase line and propelled by polyphase motors. As the power supply of the single-phase system is intermittent, whereas the power supply of a polyphase system is substantially uniform, it is necessary that all transferring devices of the type indicated be provided with an energy-storing device for the supply of the polyphase system when the instantaneous energy of the single-phase system is deficient. In the ordinary rotary phase splitter, this energy-storing function is performed by the inertia of the rotor. It is desirable to avoid, if possible, the use of a rotary phase splitter with its large weight and space consumption and I have found that its place may be satisfactorily taken by a vapor-arc device for interlinking the two systems and by providing a storage battery for supplying the polyphase system during periods of deficiency in the single-phase supply.

Referring to the form of my invention shown in Fig. 1, a non-magnetic evacuated container 4, preferably of the character employed in vapor rectifiers of the metal type, is provided with four anodes 5, 6, 7 and 8 and with six cathodes 9 to 14, inclusive (13 and 14 not shown). The anodes 5 and 7 are connected, respectively, to the terminals of the secondary winding of an adjustable transformer 15 supplied from any suitable single-phase source, such, for example, as a line 16. The cathodes 9 and 14, inclusive, are connected, respectively, to the terminals of the primary windings of three transformers 17, 18 and 19 connected to supply a three-phase consumption circuit including a three-phase induction motor 20 connected to a vehicle axle 21 for propulsion purposes. The cathodes 9 to 14, inclusive, are preferably composed of mercury, and each is contained in an insulating receptacle, as shown at 22. Suitable insulating barriers 23 separate the receptacles 22—22, and the end portions of each pool are shielded by insulating cover plates 23'—23'. An electromagnet 24 is associated with each of the cathodes 9 to 14, inclusive, and the magnets 24 are connected to be energized from a direct-current source 25 through a rotating switch 26 which periodically opens and closes the circuit to each of the magnets in rapid succession, as set forth in detail in my copending application, Serial No. 846,365, filed June 20, 1914, and assigned to the Westinghouse Electric & Manufacturing Company. Each of the cathodes 9 to 14, inclusive, is provided with a compound keep-alive circuit, as shown in connection with the cathode 9. Each keep-alive circuit comprises an anode 27 over the exposed central portion of the cathode pool and within the field of the attendant magnet 24, and an additional anode 27' located over a shielded end portion of the cathode and outside the magnetic field. Energy is supplied to the anodes 27 and 27' from a battery 28, a resistance member 29 being included in the lead to the anode 27'. A wire 30 connects neutral points in the supply and consumption circuits. A source of direct current, such, for example, as a storage battery 31, is connected between the wire 30 and the two anodes 6 and 8.

Having thus described the construction of my device, the operation is as follows: An arc is initiated within the container 4 by any suitable means and will flow to the cathode at which, for the time being, the magnet 24 is deënergized. This result follows because, at this particular cathode, there is no magnetic blowout action and the keep-alive cathode spot is exposed. At all other cathodes there exists a strong magnetic blowout action, tending to force any main power arc, which might be established, against the edge of the adjacent plate 23'. Furthermore, the magnetic field at the remaining cathodes overcomes the natural tendency of the keep-alive circuits to operate from the anodes 27 brought about by the biasing action of the keep-alive arcs at the central tinguishing the keep-alive arcs at the central portions of the cathode pools and forcing them to operate from the anodes 27' under the shelter of the plates 23'. When the voltage of the supply is at a maximum, as indicated by the crests of the waves 32 and 33 in Fig. 3, energy will flow directly to the polyphase system. When the voltage of the waves 32 and 33 falls to a point below the line 34—34, representing the voltage of the battery 31, the arc will shift to one of the anodes 6 and 8 and energy will flow therefrom until the succeeding single-phase wave rises to a sufficient height to exceed the voltage of the battery. The voltage of the polyphase system may be represented by a series of wave crests 35—35. The energy supplied to the consumption circuits directly from the single-phase system may be represented by the shaded space 36 and the energy supplied from the battery 31 by a shaded space 37. It is intended that the arc will operate from the anode 6 immediately after a current wave has flowed from one of the main anodes, as, for example, 5, and that current will flow from the other auxiliary anode 8 immediately after a wave has flowed from the main anode 7. By this means, a rotary motion of both ends of the power-transferring arc is obtained, and difficulties arising from the inertia of the arc-carrying particles are avoided.

Obviously, with the above described system, it would be necessary to have a battery 31 of very large dimensions or else to employ an auxiliary rectifier for charging purposes and it is therefore advisable to devise a system wherein the battery 31 may intermittently receive energy from the line and transfer energy to the polyphase system in a manner more nearly analogous to that of a fly wheel. Such a system is shown in Fig. 2 wherein a plurality of anodes 5', 6', 7' and 8' are mounted in a container 4' and derive energy from a source 15'. Four cathodes 9', 10', 11' and 12' are also mounted within the container 4' and are connected, respectively, to the terminals of transformers 17' and 18' associated with a consumption circuit. Two batteries 38 and 39 are provided having their positive terminals connected, respectively, to the two anodes 6' and 8' and having their negative terminals connected to a wire 30' connecting neutral points in the supply and consumption systems. The cathodes 9' and 10' are connected, respectively, to the positive terminals of the batteries 38 and 39 through asymmetric devices 40 and 41, of the vapor-arc or electrolytic type, to prevent short-circuiting. When the voltage of the main anode 5' is a maximum, energy flows therefrom to the cathode 9' and from there divides, a portion going to the transformer 17' and a portion to the battery 38 through the device 40. The lower end of the power-transferring arc is rapidly shifted around on the cathodes by a magnetic device similar to that shown in Fig. 1 and if the arc impinges upon the cathode 10' before the wave from the anode 5' has reached a lower voltage than that of the polyphase consumption system, energy will likewise be imparted to the transformer 18' and to the battery 39. When, however, the voltage of the anode 5' falls below that of the polyphase system, energy will be supplied from either the anode 6' or the anode 8' and the associated battery for the maintenance of an arc until the succeeding supply wave of the opposite polarity exceeds in value the voltage of the polyphase system and becomes effective at the main anode 7'. The upper end of the arc will take up a rotary motion, as in the device in Fig. 1, and the direction of rotation will determine, in general, whether the anode 6' or whether the anode 8' takes up the load at a period of deficient single-phase power supply. If, however, either of the batteries 38 and 39 acquires a relatively higher voltage than the other, it will take up the load during each period of power deficiency in the single-phase system, and hence, a voltage balance will soon be restored between the two batteries. Normal operation then continues, with each battery alternately receiving and giving out energy at equal rates.

While I have shown my invention in two distinct embodiments thereof, it will be apparent to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. The combination with a source of single-phase energy, of a polyphase consumption circuit, a phase-converter of the vapor-arc type connected therebetween and arranged to transfer energy from said single-phase source to said polyphase circuit, and a source of direct current connected to supply energy to said phase-converter when the instantaneous voltage of said single-phase source is less than that of the polyphase circuit.

2. The combination with a single-phase source of alternating current provided with a neutral point, of a polyphase consumption circuit, also provided with a neutral point, a phase converter of the multi-cathode vapor-arc type provided with anodes connected to the single-phase source, with cathodes connected to the polyphase consumption circuit and with an auxiliary anode, and a source of direct current connected between said auxiliary anode in said converter and said neutral point in the polyphase system for providing energy at times when the instantaneous single-phase voltage is less than the instantaneous polyphase voltage.

3. The combination with a single-phase source of alternating current, of a polyphase consumption circuit provided with a neutral point, a phase converter of the multi-cathode vapor-arc type provided with an auxiliary anode, the single-phase circuit being connected to electrodes of one polarity and the polyphase circuit being connected to electrodes of the other polarity of said converter, and a source of direct current connected between said auxiliary electrode within said converter of the polarity of the single-phase electrodes and said neutral point in the polyphase system.

4. The combination with an evacuated container, of a pair of anodes and a plurality of cathodes therein, a single-phase source of alternating current connected to said anodes, a polyphase consumption circuit provided with a neutral point connected to said cathodes, means for causing an arc within said container between said anodes and said cathodes to sweep in succession over each of said cathodes, an auxiliary anode in said container, and a source of direct current connected between said auxiliary anode and said neutral point in the polyphase system, whereby energy will be supplied to said polyphase system when the instantaneous voltage thereof exceeds the instantaneous voltage of the single-phase supply.

5. The combination with an evacuated container, of a pair of anodes therein, a source of single-phase alternating current connected to said anodes, a plurality of cathodes therein, a polyphase system of distribution, connections from said cathodes to said polyphase system, a pair of batteries, an asymmetric connection from one of said cathodes to the positive terminal of one of said batteries, an asymmetric connection from another of said cathodes to the positive terminal of the other battery, a pair of auxiliary anodes in said container, a connection from the positive terminal of each battery to one of said anodes, a connection between neutral points in said single-phase and said polyphase system and the negative terminals of said batteries, and means for causing an arc within said container to operate in succession to each of said cathodes.

6. The combination with a vapor-arc device for transferring energy from a single-phase system to a polyphase system, of an energy-storing device, means for diverting a portion of the current flow through the main electrodes of said vapor-arc device when the instantaneous voltage of the single-phase system exceeds that of the polyphase system, to said storage device, and means for returning said energy to the power-transferring arc when the instantaneous voltage of the single-phase system is below that of the polyphase system.

In testimony whereof, I have hereunto subscribed my name this 12th day of March, 1915.

FRIEDRICH W. MEYER.

Witnesses:
 D. C. DAVIS.
 B. B. HINES.